Patented Feb. 3, 1948

2,435,274

UNITED STATES PATENT OFFICE 2,435,274

CONTROL OF INSECTS

William F. Hester, Drexel Hill, Pa., assignor to Rohm & Haas Company, Philadelphia, Pa., a corporation of Delaware No Drawing. Original application June 24, 1943, Serial No. 492,133. Divided and this application May 3, 1944, Serial No. 533,953

10 Claims. (Cl. 167—30)

This invention concerns compounds of the general formula:

$X_nArSO_2NHAr(NO_2)_m$ wherein X represents a halogen, Ar represents an aryl nucleus, n represents an integer from 1 to 5, inclusive, and m represents an integer from 1 to 3, inclusive. It deals also with insecticidal compositions containing these compounds.

The compounds corresponding to the above formula may be prepared by reacting a halogenated aryl sulfonyl halide with a nitroaryl amine. The reaction may be carried out, if desired, in an organic solvent, such as benzene or pyridine. Aqueous alkali, such as solutions of sodium or potassium hydroxide, may be present during the reaction or may be added subsequent to the initial condensation. There may also be used to advantage, particularly in organic solvents, a quaternary ammonium hydroxide, such as benzyl trimethyl ammonium hydroxide. In a preferred method, the condensation is carried out in the presence of an organic amine, such as pyridine, which serves both as solvent and as a basic reagent.

There are other methods for forming the desired compounds, including the condensation of a halogenated aryl sulfonyl halide with an arylamine followed by nitration. The nitration involves primarily the aryl ring carrying the amino group. When this is a benzene ring, the first nitro group enters mostly para to the amino group with only a small proportion going to the ortho position.

As a halogenated aryl sulfonyl halide, there may be used mono, di, tri, tetra, or penta halosubstituted aryl sulfonyl chlorides or bromides. Typical of these are p-ClC$_6$H$_4$SO$_2$Cl,

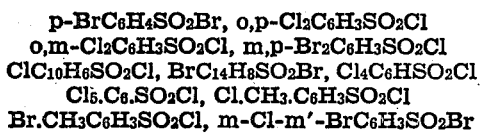

p-BrC$_6$H$_4$SO$_2$Br, o,p-Cl$_2$C$_6$H$_3$SO$_2$Cl
o,m-Cl$_2$C$_6$H$_3$SO$_2$Cl, m,p-Br$_2$C$_6$H$_3$SO$_2$Cl
ClC$_{10}$H$_6$SO$_2$Cl, BrC$_{14}$H$_8$SO$_2$Br, Cl$_4$C$_6$HSO$_2$Cl
Cl$_5$.C$_6$.SO$_2$Cl, Cl.CH$_3$.C$_6$H$_3$SO$_2$Cl
Br.CH$_3$C$_6$H$_3$SO$_2$Cl, m-Cl-m'-BrC$_6$H$_3$SO$_2$Br

The sulfonyl halides may have neutral nuclear substituents other than chlorine or bromine, as has been indicated. These substituents include such groups as alkyl and other aliphatic hydrocarbon groups, such as ethyl, propyl, butyl, tert.- butyl, octyl, isooctyl, α,α,γ,γ-tetramethyl butyl, undecenyl, allyl, etc., aryl, such as phenyl, aralkyl, such as benzyl, methylbenzyl, butylbenzyl, etc., cycloaliphatic, such as cyclohexyl, methyl cyclohexyl, etc., alkoxy, such as methoxy or ethoxy, aryloxy, such as phenoxy, acyl, such as CH$_3$CO—, C$_2$H$_5$C—, etc., nitro, other halo, or other neutral groups.

The nitroarylamines include any of the nitroanilines such as p-, m-, or o-mononitroaniline, the various dinitroanilines and trinitroanilines, and nitroanilines having other neutral substituent groups, such as methyl, ethyl, propyl, butyl, amyl, etc., phenyl, benzyl, acetyl, chloro, or bromo-. There may likewise be used polynuclear nitroarylamines, such as the nitronaphthylamines. Furthermore, as has been indicated above, an aminoaryl group which is not nitrated may be reacted with a haloaryl sulfonyl halide and nitration subsequently effected. In such case, aniline, naphthylamine, or other polynuclear arylamine may be used.

The following examples illustrate typical methods for the preparation of halogenated aryl sulfonamidonitroaryl compounds.

Example 1

4-BrC$_6$H$_4$SO$_2$NHC$_6$H$_4$NO$_2$-4.—To a solution of 27.6 parts of 4-NO$_2$C$_6$H$_4$NH$_2$ in 63 parts of pyridine was slowly added 51 parts of 4-BrC$_6$H$_4$SO$_2$Cl. The reaction was controlled by external cooling. When the reactants had been mixed, the reaction mixture was stirred for four hours. It was then diluted with ice water to which had been added about 100 parts of concentrated hydrochloric acid. A tarry product was precipitated and separated. It was recrystallized from 80% acetic acid and then from alcohol to give a crystalline product melting at 177°–179° C. and corresponding in composition to 4-BrC$_6$H$_4$SO$_2$NHC$_6$H$_4$NO$_2$-4.

Example 2

3,4-Cl$_2$C$_6$H$_3$SO$_2$NHC$_6$H$_4$NO$_2$-4.—To a solution of 27.6 parts of 4-NO$_2$C$_6$H$_4$NH$_2$ in 63 parts of pyridine there was slowly added 49 parts of 3,4-Cl$_2$C$_6$H$_3$SO$_2$Cl. The reaction mixture was cooled externally during the addition and then stirred for four hours. The mixture was then diluted with ice water containing about 100 parts of concentrated hydrochloric acid. A solid precipitated and was separated. It was recrystallized from 80% acetic acid and then from alcohol. The recrystallized material melted at 180°–181° C. It contained by analysis 20.52% of Cl and 9.41% of S, corresponding to theoretical values of 20.45% of Cl and 9.22% of S for 3,4-Cl₂C₆H₃SO₂NHC₆H₄NO₂-4

By similar methods, there may be prepared related compounds, such as:

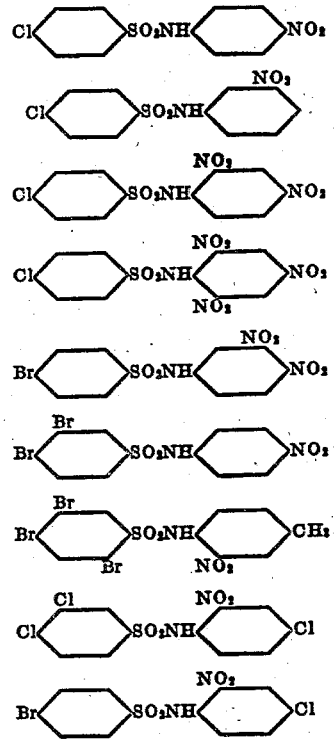

The above compounds may be summarized by the formulae:

X$_n$phenylSO₂NHphenyl(NO₂)$_m$ or

While these compounds are generally the easiest to prepare and include new compounds of exceptional insecticidal activity, there are compounds formed with naphthyl, phenanthryl, or anthryl groups which also have considerable value, such as:

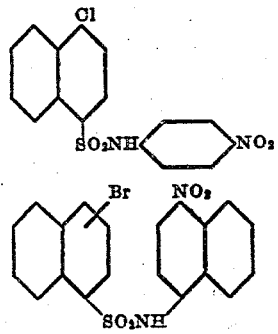

It has been found that the compounds of the type:

X$_n$ArSO₂NHAr(NO₂)$_m$ possess marked insecticidal properties against many kinds of insects. At the same time, they are not phytocidal or irritating to the skin of personnel handling and applying them. These compounds possess stability to light, air, and water, which permits their effective application over a considerable period of time. The physical properties of this class of compounds are such that they may be readily applied with or without diluents. They are well retained on foliage. Furthermore, some of the compounds of this class have suitable properties as to solubility, density, etc., which permit their use on the surface of water for the control of mosquito larvae.

The solids of this invention can be finely ground and sprayed or dusted onto water surfaces. The powder remains in the surface, and, since it is stable to light, air, and water, it remains effective for long periods of time. The compound 3,4-Cl₂C₆H₃SO₂NHC₆H₄NO₂-4 was dusted on water at the rate of seven ounces per acre. It gave a kill of mosquito larvae of 72%. This result may be compared with that obtained with Paris green, one of the few known insecticides effective for the same purpose. It required fourteen ounces per acre of Paris green to give the same control. At fourteen to sixteen ounces per acre in repeated experiments, Paris green gave 60% to 80% control. At a concentration of fourteen ounces per acre, the new compound gave a 100% kill of larvae.

This same compound was mixed with magnesium carbonate and applied to beans infested with Southern army worm. When used at as low a concentration as one-half pound per 100 gallons of water, it gave a 100% kill of this worm. There are but few compounds which show any control of the army worm.

A spray containing one pound of

4-BrC₆H₄SO₂NHC₆H₄NO₂-4 per 100 gallons of spray likewise give 100% kill of army worm and, in general, other compounds of the same type seem exceptionally effective against this pest.

These compounds have also been found exceptionally effective against aphids on various kinds of plants and thus effective at considerable dilution. For applications of this type, there may be used a composition such as:

A.

| | Parts |
|---|---|
| Toxicant | 1 |
| Spreader | 1 |
| Talc | 98 |

The toxicant may be coated on the talc or other finely divided inert carrier from a solution in an organic solvent which is evaporated from the impregnated solid. As a spreader, there may be used a soap or a synthetic detergent, such as octylphenoxyethyl sodium sulfate or cetyl dimethyl benzyl ammonium chloride.

Another formula found useful is as follows:

B.

| | Parts |
|---|---|
| Toxicant | 1 |
| Alum sludge | 48 |
| Lime | 48 |
| Soya bean oil | 3 |

The above preparations are suitable for use primarily as dusts, although they may be used in sprays. Another formula particularly useful in sprays is as follows:

C.

| | Parts |
|---|---|
| Toxicant | 1 |
| Magnesium carbonate | 3 |
| Spreader | 0.5 |
| Water | 95.5 |

This formula may be further diluted. Thus, at concentrations of toxicant of 1 to 2,000 to 1 to 4,000, it was found that controls of 90% to 100% could be obtained of green aphids on coleus, nasturtium, and bean plants. When

was thus applied at 1 to 4,000, the aphids were wiped out. This compound likewise gave complete control of red spider. In no case did any damage result to the plants sprayed. Control experiments made parallel to the above tests showed that sprays containing an accepted, standard commercial preparation at 1 to 4,000 killed only 50% of the aphids and 20% of the red spiders.

The compounds of this invention have also been applied to woolen fabrics which were then placed in a cabinet with carpet beetles. The beetles were killed in a short time. Fresh colonies of beetles were used with the same result. Tests over a three-year period showed that the fabrics retained their effectiveness over this entire period.

For this application, approximately 2% solutions were made in volatile organic solvents, wool treated therewith, the solvent evaporated from the wool, and the wool aged six weeks before being placed in the cabinet with the carpet beetles. The tests with such beetles are generally preferred over the common clothes moth and are more severe. The tests, therefore, indicate that the woolen fabrics treated with halogenated aryl sulfonamidonitroaryl compounds are well mothproofed.

The particular form or composition in which the new compounds are used as insecticides is dictated by the type of application desired, that is, whether spray or dust, the particular insects being combatted, and the nature of the other materials, if any, in the composition. Thus, as has been shown, the compounds may be mixed with or sprayed on finely divided materials, such as clay, talc, chalk, magnesium carbonate, walnut shell flour, wood flour, etc. Also, the compounds of this invention may be taken up in an organic solvent and applied as an emulsion or aerosol therefrom.

The compounds of this invention may be used as the sole toxic agent or as one of several such agents to give a plurality of effects or a single improved effect. Additional agents which may be used in conjunction with the compounds of this invention are rotenone, pyrethrins, nicotine, arsenates, oils from tars, or petroleum or of vegetable or animal origin, organic thiocyanates, etc. The compounds may also be used in conjunction with fungicides such as basic copper sulfate, cuprous oxide, copper oxychloride, dithiocarbamates, thiuram sulfides, etc.

The present application constitutes a division of my application Serial No. 492,133, filed June 24, 1943, now Patent Number 2,402,623 issued June 25, 1946.

I claim:

1. A method of controlling mosquito larvae in water which comprises applying to the surface of water in finely divided form a compound of the formula:

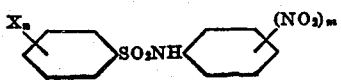

wherein X is a halogen, $n$ is an integer from one to five, inclusive, and $m$ is an integer from one to three, inclusive.

2. A method of controlling mosquito larvae in water which comprises applying to the surface of water in finely divided form a compound of the formula:

3. A method of controlling mosquito larvae in water which comprises applying to the surface of water in finely divided form a compound of the formula:

4. The process of controlling insects which comprises supplying the environment of said insects with a compound of the formula:

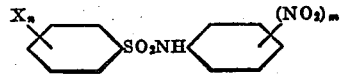

wherein X is a halogen, $n$ is an integer from one to five, inclusive, and $m$ is an integer from one to three, inclusive.

5. The process of controlling insects which comprises supplying the environment of said insects with a compound of the formula:

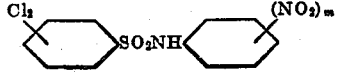

wherein $m$ is an integer from one to three, inclusive.

6. The process of controlling insects which comprises supplying the environment of said insects with a compound of the formula:

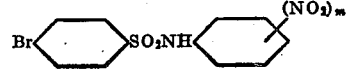

wherein $m$ is an integer from one to three, inclusive.

7. The process of controlling insects which comprises supplying the environment of said insects with a compound of the formula:

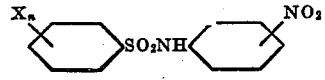

wherein X is a halogen and $n$ is an integer from one to five, inclusive.

8. The process of controlling insects on living plants which comprises applying to said plants a composition which contains as an active agent a compound of the formula:

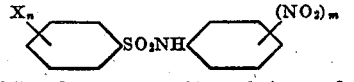

wherein X is a halogen, $n$ is an integer from one to five, inclusive, and $m$ is an integer from one to three, inclusive.

9. The process of controlling insects on living plants which comprises applying to said plants a composition which contains as an active agent a compound of the formula:

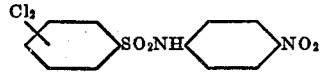

10. The process of controlling insects on living plants which comprises applying to said plants a composition which contains as an active agent a compound of the formula:
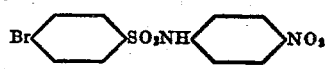
WILLIAM F. HESTER.
REFERENCES CITED
The following references are of record in the file of this patent:
UNITED STATES PATENTS
| Number | Name | Date |
|---|---|---|
| 1,955,207 | Stotter et al. | Apr. 17, 1934 |
| 1,962,276 | Huismann et al. | June 12, 1934 |
| 2,292,998 | Hentrich et al. | Aug. 11, 1942 |
| 2,402,623 | Hester | June 25, 1946 |
OTHER REFERENCES
Metcalf et al., Jr. of Economic Entomology, vol. 34, 1941, pages 308–309.